(12) United States Patent
Kobayashi

(10) Patent No.: US 9,975,516 B2
(45) Date of Patent: May 22, 2018

(54) OCCUPANT PROTECTION DEVICE FOR VEHICLE

(71) Applicant: TOYOTA JIDOSHA KABUSHIKI KAISHA, Aichi-ken (JP)

(72) Inventor: Ippei Kobayashi, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days. days.

(21) Appl. No.: 15/598,846

(22) Filed: May 18, 2017

(65) Prior Publication Data

US 2017/0341615 A1  Nov. 30, 2017

(30) Foreign Application Priority Data

May 24, 2016 (JP) ................................. 2016-103699

(51) Int. Cl.
| | |
|---|---|
| *B60R 21/16* | (2006.01) |
| *B60R 21/207* | (2006.01) |
| *B60R 21/217* | (2011.01) |
| *B60R 21/231* | (2011.01) |
| *B60R 21/2334* | (2011.01) |
| *B60R 21/00* | (2006.01) |

(52) U.S. Cl.
CPC .......... *B60R 21/207* (2013.01); *B60R 21/217* (2013.01); *B60R 21/2334* (2013.01); *B60R 21/23138* (2013.01); *B60R 2021/0053* (2013.01); *B60R 2021/23146* (2013.01)

(58) Field of Classification Search
CPC ...... B60N 2/42; B60N 2/42763; B60R 21/16; B60R 21/207; B60R 21/231; B60R 2021/23146; B60R 2021/0055

USPC ...................... 280/728.2, 730.2, 743.1, 743.2
See application file for complete search history.

(56) References Cited

U.S. PATENT DOCUMENTS

| | | | |
|---|---|---|---|
| 7,669,889 B1* | 3/2010 | Gorman ................ | B60R 21/207 280/730.2 |
| 2012/0223550 A1* | 9/2012 | Mazanek .............. | B60R 21/207 297/216.1 |
| 2013/0257027 A1* | 10/2013 | Kwon ................... | B60R 21/233 280/743.2 |
| 2014/0001799 A1* | 1/2014 | Kalisz ................... | B60R 21/207 297/216.1 |

(Continued)

FOREIGN PATENT DOCUMENTS

| | | |
|---|---|---|
| JP | 2005-022466 A | 1/2005 |
| JP | 2010-064632 A | 3/2010 |
| JP | 2017-30446 A | 2/2017 |

*Primary Examiner* — Toan To
(74) *Attorney, Agent, or Firm* — Hauptman Ham, LLP

(57) ABSTRACT

An occupant protection device for a vehicle includes a seat frame, an inflator and a side airbag. The seat frame is provided at a seat lower side of a side support portion. The seat frame includes an upright wall portion and an upper wall portion. The inflator is provided at the seat lower side of the upper wall portion. The side airbag is disposed between the side support portion and the seat frame. In an inflated state, the side airbag includes a first inflation portion that causes an upper portion of the side support portion to bulge to the seat upper side and the seat width direction inner side, and a second inflation portion that causes a lower portion of the side support portion to bulge to the seat upper side and the seat width direction inner side.

11 Claims, 7 Drawing Sheets

(56) References Cited

U.S. PATENT DOCUMENTS

| | | | |
|---|---|---|---|
| 2014/0015234 A1* | 1/2014 | Nukaya | B60N 2/42718 |
| | | | 280/730.1 |
| 2017/0028960 A1 | 2/2017 | Kobayashi et al. | |
| 2017/0036633 A1* | 2/2017 | Kobayashi | B60R 21/18 |
| 2017/0066400 A1* | 3/2017 | Fujiwara | B60R 21/217 |
| 2017/0225640 A1* | 8/2017 | Ohno | B60R 21/207 |
| 2017/0369020 A1* | 12/2017 | Hiraiwa | B60R 21/207 |
| 2018/0001801 A1* | 1/2018 | Tanabe | B60N 2/42 |

* cited by examiner

OCCUPANT PROTECTION DEVICE FOR VEHICLE

CROSS-REFERENCE TO RELATED APPLICATION

This application is based on and claims priority under 35 USC 119 from Japanese Patent Application No. 2016-103699 filed on May 24, 2016, the disclosure of which is incorporated by reference herein.

BACKGROUND

Technical Field

The present disclosure relates to an occupant protection device for a vehicle.

Related Art

Japanese Patent Application Laid-Open (JP-A) No. 2005-022466 (Patent Document 1) discloses a structure in which an airbag is provided at a lower side of a side portion (a side support portion) of a seat cushion. In this structure, the airbag is covered from a seat width direction outer side by a cover member. When the airbag is supplied with gas from an inflator, the cover member is ruptured by inflation pressure of the airbag, and the airbag inflates and expands to the seat upper side.

Meanwhile, JP-A No. 2010-064632 (Patent Document 2) discloses a structure in which an airbag and an inflator are stowed inside side support portions at the left and right of a seat cushion. In the structure of Patent Document 2, movement of an occupant in the seat width direction is limited by the airbag at the side at which a collision occurs being inflated and a projection amount of the side support portion at the collision side being increased.

In the technology recited in Patent Document 1, the airbag inflates and expands at the seat width direction outer side relative to the side support portion. Therefore, some time is taken before the airbag restrains the occupant. Meanwhile, in the technology recited in Patent Document 2, because movement of the occupant in the seat width direction is limited by the projection amount of the side support portion being increased, a duration before the occupant is restrained is shorter than that according to Patent Document 1. However, this structure does not actively restrain the occupant. Thus, there is scope for improvement in regard to improving restraint performance of the pelvis area and thigh area.

SUMMARY

In consideration of the circumstances described above, an object of the present disclosure is to provide an occupant protection device for a vehicle that may improve restraint performance for the pelvis area and thigh area of an occupant during a collision of the vehicle.

An occupant protection device for a vehicle according to a first aspect includes: a seat frame provided at a seat lower side of a side support portion, the side support portion projecting from a seat cushion to the seat upper side at a seat width direction outer side relative to a sitting portion, and the seat frame including an upright wall portion that, viewed from the seat front, extends in the seat vertical direction and an upper wall portion that projects to the seat width direction inner side from an upper end portion of the upright wall portion; an inflator provided at the seat lower side of the upper wall portion; and a side airbag disposed between the side support portion and the seat frame, the side airbag receiving a gas supply from the inflator and inflating, and the side airbag including a first inflation portion that, in an inflated state, causes an upper portion of the side support portion to bulge to the seat upper side and the seat width direction inner side, and a second inflation portion that, in the inflated state, causes a lower portion of the side support portion to bulge to the seat upper side and the seat width direction inner side.

DETAILED DESCRIPTION

First Exemplary Embodiment

Figure 1:
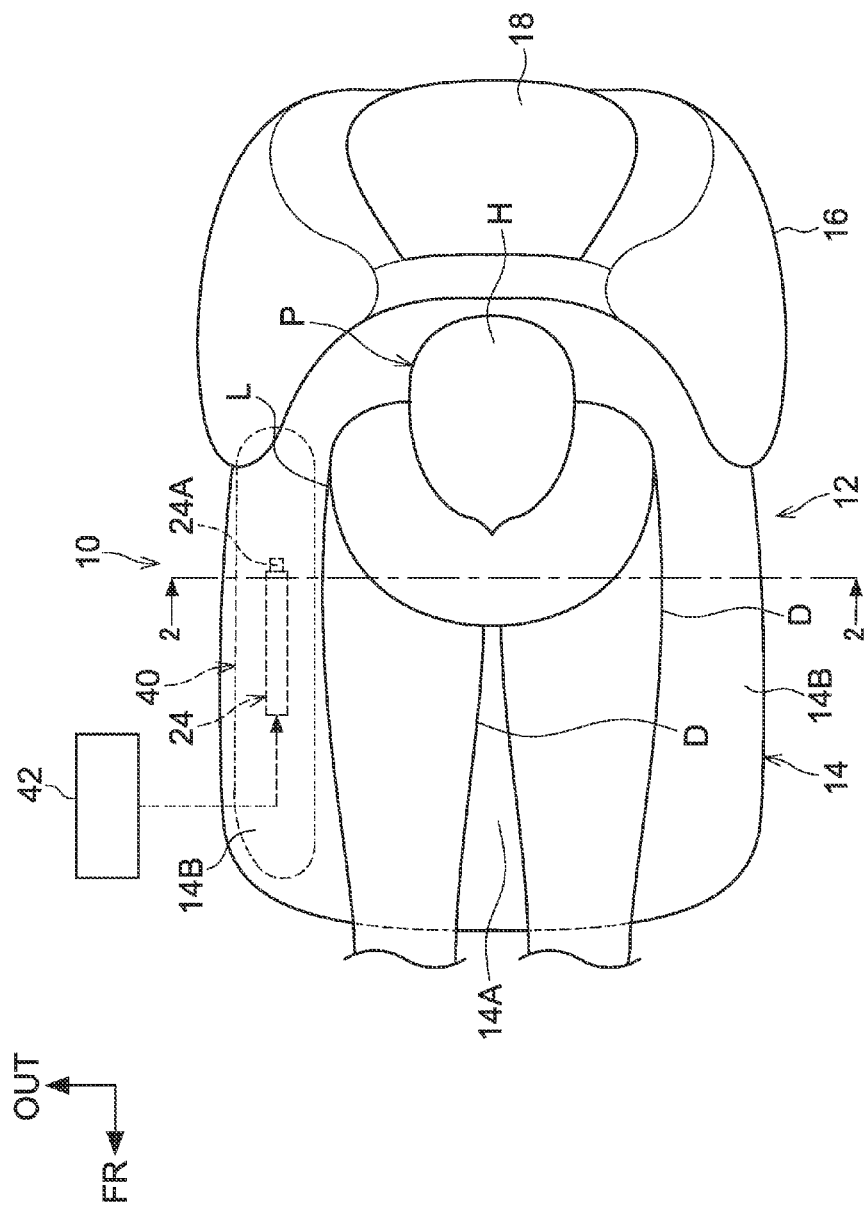
FIG. 1 is a plan view of a vehicle seat in which an occupant protection device for a vehicle in accordance with a first exemplary embodiment is employed.

A vehicle occupant protection device 10 according to a first exemplary embodiment of the present disclosure is described in accordance with the drawings. An arrow FR and an arrow UP that are marked in the drawings as appropriate indicate a front direction (a direction in which a seat occupant faces) and an upper direction of a vehicle seat 12, respectively. Where descriptions are given using the directions front, rear, up, down, left and right, unless particularly specified, these represent the front and rear in the seat front-and-rear direction, up and down in the seat vertical direction, and left and right with respect to the seat front-and-rear direction when the seat is facing forward. An arrow OUT that is marked as appropriate in the drawings indicates a vehicle width direction outer side of an automobile that serves as the vehicle in which the vehicle seat 12 is installed.

—Structure of the Vehicle Occupant Protection Device—

As shown in FIG. 1, the vehicle occupant protection device 10 according to the present exemplary embodiment (hereinafter referred to simply as the occupant protection device 10) is installed in the vehicle seat 12.

The vehicle seat 12 is disposed to be offset to left or right (to the right side in the present exemplary embodiment) relative to the middle in the vehicle width direction of the vehicle body of the automobile, which is not shown in the drawings. In the present exemplary embodiment, the seat front-and-rear direction of the vehicle seat 12 matches a front-and-rear direction of the vehicle, and a seat width direction of the vehicle seat 12 matches the vehicle width direction.

The drawings illustrate a state in which a crash test dummy (a mannequin) that serves as a model of a vehicle occupant who is to be protected is seated on a seat cushion 14 of the vehicle seat 12. The dummy is, for example, a WorldSID (World Side Impact Dummy) AM50 dummy (representing the 50th percentile of American adult males). The dummy is seated in a standard sitting attitude designated for impact testing, and the vehicle seat 12 is disposed at a standard specified position corresponding to the sitting attitude. Below, in order to facilitate understanding of the descriptions, the dummy is referred to as "the occupant P".

The vehicle seat 12 includes the seat cushion 14, a seatback 16 and a headrest 18. The seat cushion 14 is for supporting the pelvis area L (including the buttocks) and thigh area D of the occupant P. The seatback 16 is for supporting the back area of the occupant P. The headrest 18 is for supporting the head area H of the occupant P.

Figure 2:
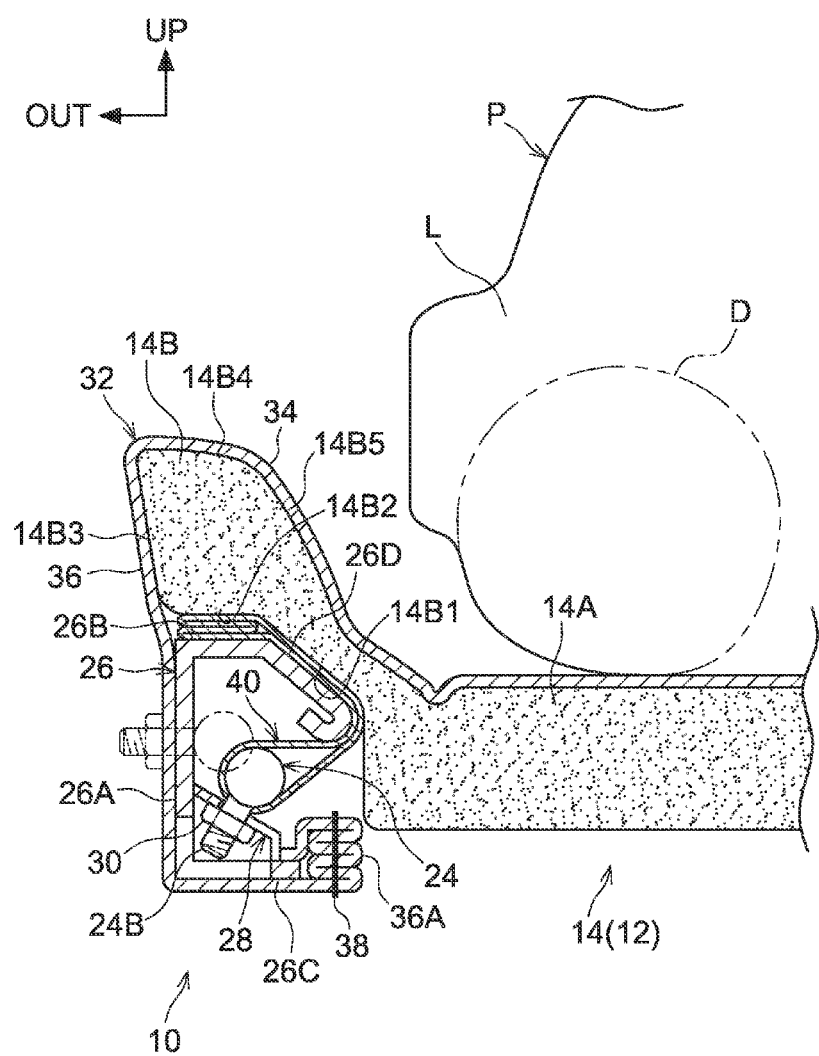
FIG. 2 is a sectional diagram cut along line 2-2 in FIG. 1, showing a state before inflation of a side airbag.

As shown in FIG. 2, the seat cushion 14 includes a sitting portion 14A (a general portion) and side support portions 14B. The occupant P sits on the sitting portion 14A. The side support portions 14B protrude to the seat upper side at seat width direction outer sides relative to the sitting portion 14A. In the present exemplary embodiment, the pair of side support portions 14B are provided at both sides in the seat width direction relative to the sitting portion 14A (only the side support portion 14B at the seat right side is shown in FIG. 2). The pair of side support portions 14B are for suppressing lateral shifting of the pelvis area L and thigh area D of the occupant P. The pair of side support portions 14B are formed integrally with the sitting portion 14A of a foam material such as urethane or the like.

Viewed from the seat front, each side support portion 14B projects diagonally to the seat width direction outer side and the seat upper side from a respective seat width direction outer side end portion of the sitting portion 14A. A distal end portion of the side support portion 14B protrudes to the seat upper side. In specific terms, the side support portion 14B includes a lower side angled face 14B1 and a lower face 14B2. The lower side angled face 14B1 is angled to the seat upper side toward the seat width direction outer side from a proximal end portion of the side support portion 14B. The lower face 14B2 extends to the seat width direction outer side from a seat width direction outer side end of the lower side angled face 14B1. The side support portion 14B further includes, from a seat width direction outer side end of the lower face 14B2, an outer side face 14B3 that is angled a little to the seat width direction outer side toward the seat upper side. The side support portion 14B still further includes an upper face 14B4 and an upper side angled face 14B5. The upper face 14B4 extends to the seat width direction inner side from the upper end of the outer side face 14B3. The upper side angled face 14B5 is angled to the seat width direction inner side toward the seat lower side from a seat width direction inner side end portion of the upper face 14B4. A lower portion of the upper side angled face 14B5 is angled more shallowly than an upper portion of the upper side angled face 14B5 and connects with the sitting portion 14A.

A region enclosed by the lower face 14B2, the outer side face 14B3, the upper face 14B4 and the upper portion of the upper side angled face 14B5 of the side support portion 14B structured as described above corresponds to an "upper portion of the side support portion" relating to the present disclosure. A region at the seat lower side relative to the upper portion of the side support portion 14B, which is to say a region sandwiched between the lower portion of the upper side angled face 14B5 and the lower side angled face 14B1, corresponds to a "lower portion of the side support portion" relating to the present disclosure.

A seat frame 26 structuring the occupant protection device 10, which is a frame of the seat cushion 14, is disposed at the seat lower side of the side support portion 14B. The seat frame 26 is fixed to a cushion frame or the like, which is not shown in the drawings. In this structure, the side support portion 14B is supported from the seat lower side thereof by the seat frame 26.

Figure 3:
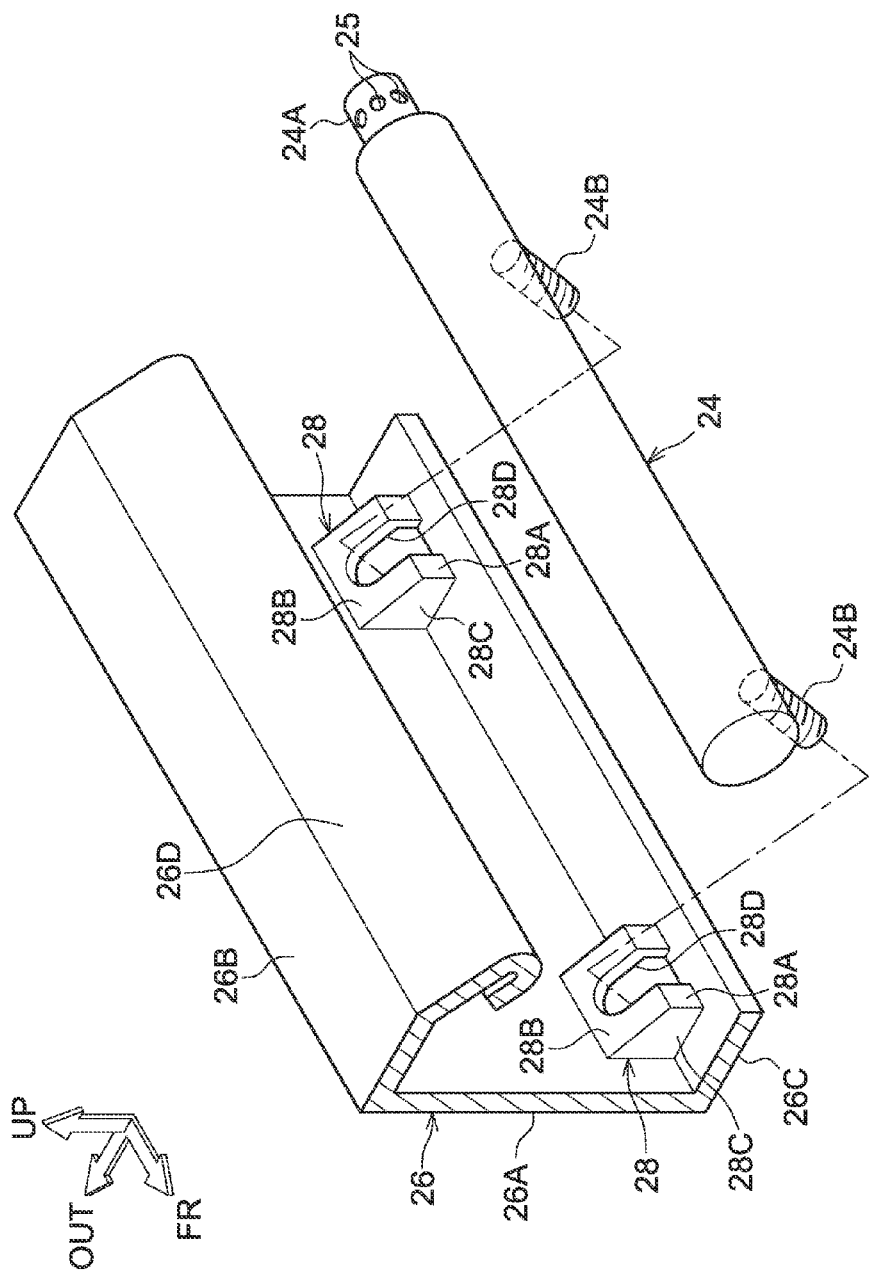
FIG. 3 is an exploded perspective view showing an inflator and a seat frame magnified.

As shown in FIG. 3, the seat frame 26 is provided with an upright wall portion 26A that extends in the seat vertical direction as viewed from the seat front. The seat frame 26 is also provided with an upper wall portion 26B and a lower wall portion 26C. The upper wall portion 26B projects to the seat width direction inner side from an upper end portion of the upright wall portion 26A. The lower wall portion 26C projects to the seat width direction inner side from a lower end portion of the upright wall portion 26A. An angled face 26D is formed at a distal end side of the upper wall portion 26B. The angled face 26D is angled to the seat lower side toward the seat width direction inner side. A distal end portion of the angled face 26D is bent back toward the seat lower side and then the seat width direction outer side. An end portion at the seat width direction inner side of the angled face 26D forms a curved surface with a circular arc shape. Because of this machining of the seat width direction inner side end portion of the angled face 26D, piercing of a side airbag 40 by the seat width direction inner side end portion of the angled face 26D during inflation of the side airbag 40, which is described below, is suppressed.

Attachment portions 28 are provided at the seat frame 26. An inflator 24 that constitutes an element of the occupant protection device 10 is attached to the attachment portions 28. The attachment portions 28 are formed integrally with the seat frame 26. In the present exemplary embodiment, the attachment portions 28 are formed at a front end portion and a rear end portion of the seat frame 26. Each attachment portion 28 is disposed within a cross section demarcated by the upright wall portion 26A, upper wall portion 26B and lower wall portion 26C of the seat frame 26. In specific terms, the attachment portion 28 is formed by a corner portion between the upright wall portion 26A and the lower wall portion 26C being caused to protrude to the seat width direction inner side and the seat upper side. The attachment portion 28 includes an inner side wall portion 28A, an upper side angled wall portion 28B, side wall portions 28C and an insertion hole 28D.

The inner side wall portion 28A is disposed at the seat width direction inner side of the attachment portion 28 with a thickness direction of the inner side wall portion 28A in the seat width direction. The inner side wall portion 28A projects upward from an upper face of the lower wall portion 26C. The upper side angled wall portion 28B connects between an upper end portion of the inner side wall portion 28A and the upright wall portion 26A. The upper side angled wall portion 28B is angled to the seat upper side toward the seat width direction outer side. The side wall portions 28C are provided at a front end portion and a rear end portion of the attachment portion 28, with thickness directions in the seat front-and-rear direction. The side wall portions 28C connect between the upright wall portion 26A, the lower wall portion 26C, the inner side wall portion 28A and the upper side angled wall portion 28B. The insertion hole 28D is formed continuously from a lower portion of the inner side wall portion 28A to an upper portion of the upper side angled wall portion 28B. An upper end portion of the insertion hole 28D is formed in a circular arc shape. A width of the insertion hole 28D is slightly wider than a diameter of a stud bolt 24B, which protrudes from the inflator 24.

The inflator 24 is a "cylinder-type" inflator and is disposed at the seat lower side of the upper wall portion 26B of the seat frame 26. A length direction of the inflator 24 is set in the seat front-and-rear direction. A gas jetting-out portion 24A is provided at one length direction end portion of the inflator 24. In the present exemplary embodiment, the gas jetting-out portion 24A is provided at a rear end portion of the inflator 24. The gas jetting-out portion 24A is formed with a smaller diameter than a general portion of the inflator 24. A plural number of gas jetting-out openings 25 are formed in the periphery of the inflator 24. As shown in FIG. 1, the inflator 24 is electronically connected with an electronic control unit (ECU) 42, which is a control unit. The inflator 24 is configured to activate in accordance with signals from the ECU 42. When the inflator 24 activates, gas is jetted out from the gas jetting-out openings 25 of the gas jetting-out portion 24A.

As shown in FIG. 3, a pair of the stud bolts 24B protrude from an outer face of the inflator 24. The stud bolts 24B are provided to be spaced apart in the axial direction of the inflator 24, and protrude in a direction orthogonal to the axial direction of the inflator 24.

When the inflator 24 is to be attached to the attachment portions 28 of the seat frame 26, in a state in which positions of the stud bolts 24B are lined up with the insertion holes 28D of the attachment portions 28, the inflator 24 is slid in and the stud bolts 24B are inserted through the insertion holes 28D. Then, as shown in FIG. 2, in the state in which the stud bolts 24B are inserted through the insertion holes 28D, nuts 30 are twisted onto the stud bolts 24B. Thus, the inflator 24 is fixed to the attachment portions 28. In this state, distal ends of the stud bolts 24B are disposed at the seat width direction inner side relative to the upright wall portion 26A and at the seat upper side relative to the lower end of the upright wall portion 26A. Thus, the inflator 24 and the stud bolts 24B are contained within the cross section of the seat frame 26.

In FIG. 2, an attachment structure of an inflator according to a comparative example is depicted by imaginary lines (two-dot chain lines). In this comparative example, stud bolts protrude to the seat width direction outer side from the inflator, and these stud bolts are inserted through the upright wall portion 26A. Therefore, in the comparative example, the distal ends of the stud bolts pierce through a cover skin 32, which is described below, and are disposed outside the cross section of the seat frame 26.

The seat cushion 14 and the seat frame 26 are covered by the cover skin 32. The cover skin 32 includes a cover skin main body portion 34 and a cover skin side portion 36. The cover skin main body portion 34 covers the sitting portion 14A and side support portion 14B of the seat cushion 14 from the seat upper side. The cover skin side portion 36 covers the side support portion 14B and the seat frame 26 from the seat width direction outer side. In the present exemplary embodiment, the cover skin side portion 36 and a region of the cover skin main body portion 34 that covers the side support portion 14B are constituted by a single member, in which the cover skin side portion 36 extends to the seat lower side from a seat width direction outer side end portion of the cover skin main body portion 34. However, the cover skin main body portion 34 and the cover skin side portion 36 may be constituted by separate members, with the seat width direction outer side end portion of the cover skin main body portion 34 and an upper end portion of the cover skin side portion 36 being joined and made integral by stitching or the like.

A distal end region of the cover skin side portion 36 extends to the seat width direction inner side along the lower wall portion 26C, is turned back to the seat upper side, and is fixed to the distal end of the lower wall portion 26C. An excess portion 36A is provided at a region of the cover skin side portion 36 at the seat width direction inner side of the lower wall portion 26C. At the excess portion 36A, the cover skin side portion 36 is folded over on itself in the seat vertical direction, in an accordion shape, and is joined up by a tear seam portion 38. During the inflation of the side airbag 40 described below, as a result of inflation pressure of the side airbag 40, the tear seam portion 38 is ruptured and the excess portion 36A is expanded by the action on the cover skin side portion 36 of a tension force in the seat vertical direction.

The side airbag 40, which constitutes an element of the occupant protection device 10, is disposed between the side support portion 14B and the seat frame 26. As an example, the side airbag 40 is formed in a bag shape by outer periphery portions of plural base cloths being sewn together, and the inflator 24 is disposed inside this side airbag 40. Because the stud bolts 24B penetrate through the side airbag 40, one end side of the side airbag 40 is fixed to the attachment portions 28 of the seat frame 26 together with the inflator 24.

Another end side of the side airbag 40, in the uninflated state thereof, extends to the seat width direction inner side from the inflator 24 to the distal end of the angled face 26D of the seat frame 26, and is arranged along the angled face 26D and the upper wall portion 26B as far as an end portion at the seat width direction outer side of the side support portion 14B. The another end portion of the side airbag 40 is then folded back to the inner side of the side airbag 40.

Figure 4:
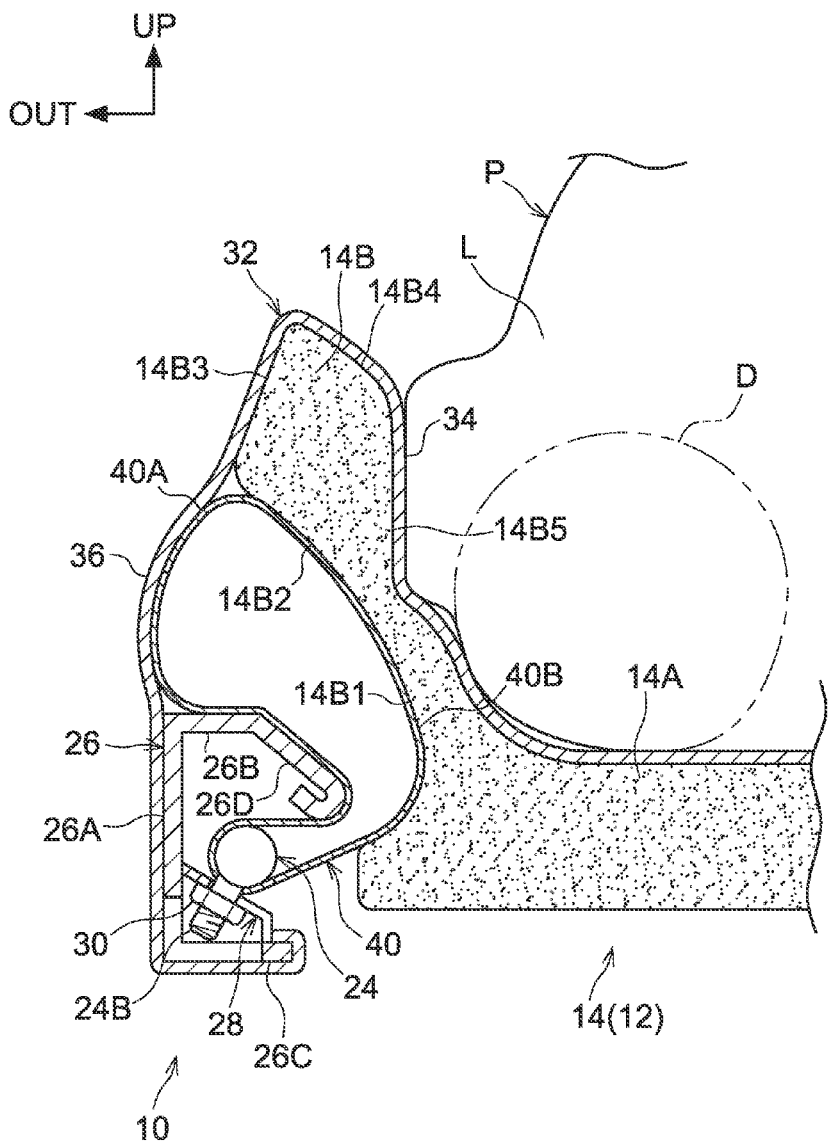
FIG. 4 is a sectional diagram corresponding to FIG. 2, showing an inflated state of the side airbag structuring the occupant protection device for a vehicle in accordance with the first exemplary embodiment.

As shown in FIG. 4, the side airbag 40 is provided with a first inflation portion 40A that, in the inflated state, causes the upper portion of the side support portion 14B to bulge to the seat upper side and the seat width direction inner side. The side airbag 40 is also provided with a second inflation portion 40B, which is in fluid communication with the first inflation portion 40A. In the inflated state, the second inflation portion 40B causes the lower portion of the side support portion 14B to bulge to the seat upper side and the seat width direction inner side.

The first inflation portion 40A inflates above the upper wall portion 26B of the seat frame 26 at the seat width direction outer side relative to the angled face 26D. In specific terms, the gas is supplied from the inflator 24 and the first inflation portion 40A inflates while unfolding the folded state thereof, is subjected to a reaction force from a region of the upper wall portion 26B at the seat width direction outer side, and inflates to the upper side. At this time, a tension force in the seat vertical direction acts on the cover skin side portion 36. As a result, the tear seam portion 38 of the cover skin side portion 36 is ruptured and the excess portion 36A of the cover skin side portion 36 expands (see FIG. 2).

Inflation of the first inflation portion 40A to the seat width direction outer side is restricted by the cover skin side portion 36. Consequently, while the first inflation portion 40A is inflating, the first inflation portion 40A pushes the lower face 14B2 of the side support portion 14B to the seat upper side and the seat width direction inner side. As a result, the upper portion of the side support portion 14B is displaced so as to turn to the seat width direction inner side about a proximal end portion thereof, as viewed from the seat front side. Hence, the upper portion of the side support portion 14B abuts against the upper side of the pelvis area L of the occupant P from the seat width direction outer side thereof, restraining the upper side of the pelvis area L of the occupant P.

Meanwhile, the second inflation portion 40B inflates between the angled face 26D of the seat frame 26 and the occupant P (particularly the pelvis area L and the thigh area D). In specific terms, the second inflation portion 40B is subjected to a reaction force from the angled face 26D and inflates to the seat upper side and the seat width direction inner side. Consequently, while the second inflation portion 40B is inflating, the second inflation portion 40B pushes the lower portion of the side support portion 14B to the seat upper side and the seat width direction inner side. Thus, the lower portion of the side support portion 14B is pushed up to the seat upper side and the seat width direction inner side by the second inflation portion 40B being inflated, and the thigh area D and the lower side of the pelvis area L of the occupant P are restrained by the lower portion of the side support portion 14B.

The ECU 42 according to the present exemplary embodiment is electronically connected to a collision sensor, which is not shown in the drawings, that detects a collision of the vehicle. This collision sensor is structured with, for example, an acceleration sensor that detects accelerations of the vehicle, and is configured to be able to detect collisions of a variety of collision modes. The ECU 42 activates the inflator 24 when a collision of the vehicle is detected on the basis of signals from the unillustrated collision sensor. If a pre-crash sensor that predicts a collision of the vehicle is electronically connected to the ECU 42, the ECU 42 may also be configured to activate the inflator 24 when the ECU 42 predicts a collision of the vehicle on the basis of signals from the pre-crash sensor.

—Operation and Effects—

Now, operation and effects of the present exemplary embodiment are described.

In the occupant protection device 10 according to the present exemplary embodiment, when there is a collision such as a side collision of the like, the first inflation portion 40A of the side airbag 40 is inflated. As a result, the upper portion of the side support portion 14B bulges (is pushed up) to the seat upper side and the seat width direction inner side, and restrains the upper side of the pelvis area L of the occupant P. The second inflation portion 40B of the side airbag 40 is also inflated. As a result, the lower portion of the side support portion 14B bulges (is pushed up) to the seat upper side and the seat width direction inner side, and restrains the thigh area D and the lower side of the pelvis area L of the occupant P. Thus, the pelvis area L and thigh area D of the occupant P may be restrained over a wide range.

Figure 5:
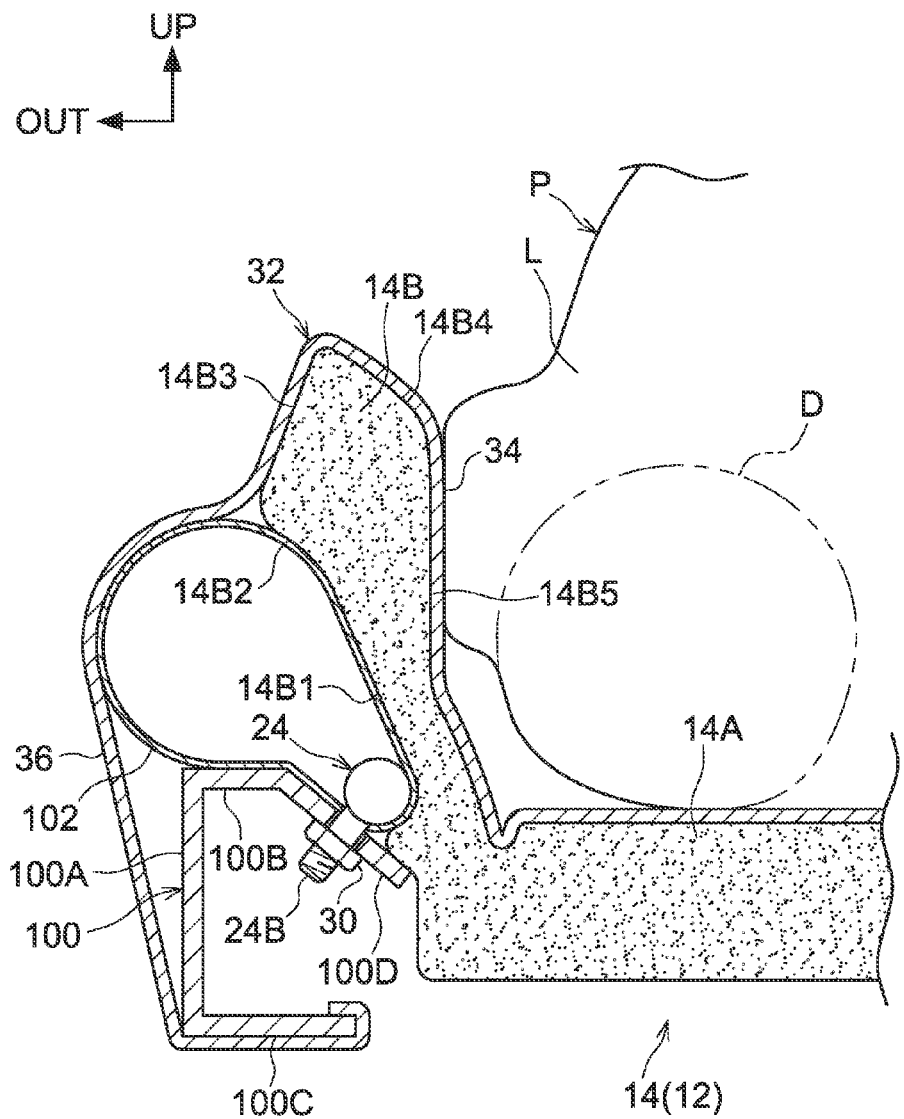
FIG. 5 is a sectional diagram corresponding to FIG. 2, showing a state in which inflation of a side airbag in accordance with a comparative example has been completed.

This effect is described in more detail using a vehicle occupant protection device according to a comparative example shown in FIG. 5. In FIG. 5, members with structures that are similar to members of the vehicle seat 12 according to the present exemplary embodiment are assigned the same reference symbols.

As shown in FIG. 5, viewed from the seat front, a seat frame 100 according to the comparative example is provided with an upright wall portion 100A that extends in the seat vertical direction. The seat frame 100 is provided with an upper wall portion 100B that projects to the seat width direction inner side from an upper end portion of the upright wall portion 100A, and a lower wall portion 100C that projects to the seat width direction inner side from a lower end portion of the upright wall portion 100A. An angled face 100D is formed at the distal end side of the upper wall portion 100B. The angled face 100D is angled to the seat lower side toward the seat width direction inner side. The inflator 24 is attached to the angled face 100D.

The inflator 24 is disposed at the upper face side of the angled face 100D. The stud bolts 24B protrude to the seat lower side and the seat width direction outer side from the inflator 24. The stud bolts 24B are inserted through the angled face 100D and the nuts 30 are twisted onto the stud bolts 24B.

A side airbag 102 according to the comparative example is disposed above the upper wall portion 100B of the seat frame 100. The side airbag 102 inflates while pushing the upper portion of the side support portion 14B to the seat upper side and the seat width direction inner side. A lower end portion of the side airbag 102 is disposed at a vertical direction middle region of the angled face 100D. Therefore, even when the side airbag 102 inflates, the lower portion of the side support portion 14B hardly bulges at all. In other words, the side airbag 102 according to the comparative example is not provided with a region that corresponds to the second inflation portion 40B of the side airbag 40 according to the present exemplary embodiment.

In the vehicle occupant protection device according to the comparative example as described above, when the side airbag 102 inflates, the lower portion of the side support portion 14B barely at all bulges to the seat upper side and the seat width direction inner side. Therefore, a gap between the occupant P (i.e., the thigh area D and the lower side of the pelvis area L) and the lower portion of the side support portion 14B is not filled. Thus, there is scope for improvement with regard to excellently restraining the thigh area D and the lower side of the pelvis area L of the occupant P. In contrast, in the present exemplary embodiment as shown in FIG. 4, when the first inflation portion 40A and second inflation portion 40B of the side airbag 40 are inflated, the upper portion and the lower portion of the side support portion 14B may be caused to bulge to the seat upper side and the seat width direction inner side. Therefore, the gap between the occupant P (i.e., the thigh area D and the lower side of the pelvis area L) and the lower portion of the side support portion 14B may be filled, and restraint performance for the thigh area D and pelvis area L of the occupant P during a collision of the vehicle may be improved. Furthermore, in the vehicle occupant protection device according to the comparative example, because the inflator 24 is attached to the upper face side of the angled face 100D, a thickness of the lower portion of the side support portion 14B is reduced. In contrast, in the present exemplary embodiment the inflator 24 is disposed within the cross section of the seat frame 26. Therefore, the thickness of the lower portion of the side support portion 14B may be assured and seating comfort may be excellently maintained.

In the present exemplary embodiment, the second inflation portion 40B is subjected to a reaction force from the angled face 26D of the seat frame 26 and inflates to the seat upper side and the seat width direction inner side. Therefore, the lower portion of the side support portion 14B may be more effectively caused to bulge to the seat upper side and the seat width direction inner side than in a structure in which the angled face 26D is not formed at the upper wall portion 26B of the seat frame 26. Consequently, restraint performance for the pelvis area L and thigh area D of the occupant P may be enhanced.

In the present exemplary embodiment, the inflator 24 is disposed at the seat lower side of the upper wall portion 26B. Furthermore, because the inflator 24 is attached to the attachment portions 28, the distal ends of the stud bolts 24B protruding from the inflator 24 are disposed at the seat width direction inner side relative to the upright wall portion 26A and at the seat upper side relative to the lower end of the upright wall portion 26A. Thus, the inflator 24 and the stud bolts 24B are contained within the cross section of the seat frame 26. Therefore, a case of the stud bolts 24B piercing through the cover skin 32 (the cover skin side portion 36) and protruding to the outer side of the seat frame 26 may be inhibited, and the design appearance of the vehicle seat 12 may be excellently maintained. By contrast, in the structure in which stud bolts penetrate through the upright wall portion 26A as in the comparative example depicted by imaginary lines in FIG. 2, the distal ends of the stud bolts may protrude to the outer side of the cover skin side portion 36 and there may be a deterioration in the appearance of the vehicle seat 12.

The present exemplary embodiment has a structure in which the cover skin 32 is not torn open during the inflation of the side airbag 40 but the side airbag 40 in the inflated state is inflated inside the cover skin 32. Therefore, the first inflation portion 40A may be inflated to the seat width direction inner side effectively, and the upper portion of the side support portion 14B may be displaced further to the seat width direction inner side. Because there is no need to form a stitched portion or the like to serve as a tearing start point in the cover skin 32, the appearance of the vehicle seat 12 may be more excellently maintained than in a structure in which the side airbag 40 is inflated with the cover skin 32 being torn open.

Second Exemplary Embodiment

Now, a vehicle occupant protection device 50 (below referred to simply as the occupant protection device 50) according to a second exemplary embodiment is described with reference to FIG. 6 and FIG. 7. Structures that are the same as in the first exemplary embodiment are assigned the same reference symbols and, as appropriate, are not described. The present exemplary embodiment differs from the first exemplary embodiment in that a seat cushion airbag 52 that is in fluid communication with the side airbag 40 is provided.

Figure 6:
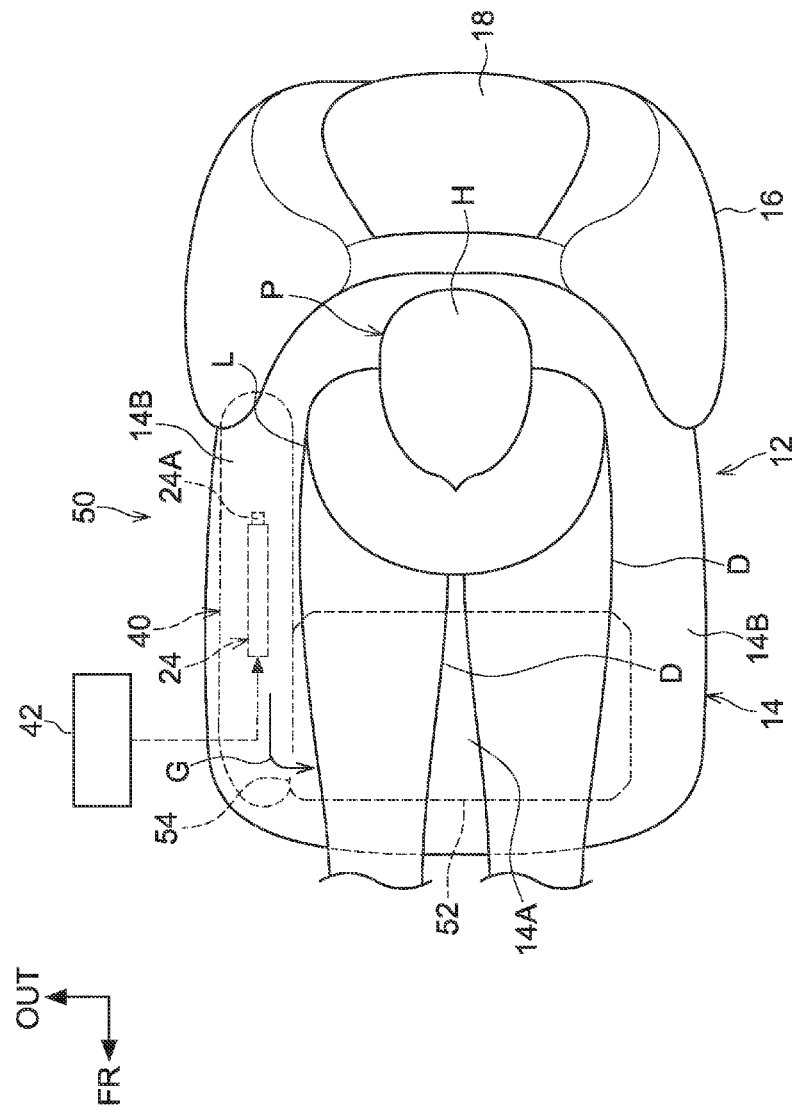
FIG. 6 is a plan view of a vehicle seat in which an occupant protection device for a vehicle in accordance with a second exemplary embodiment is employed.
Figure 7:
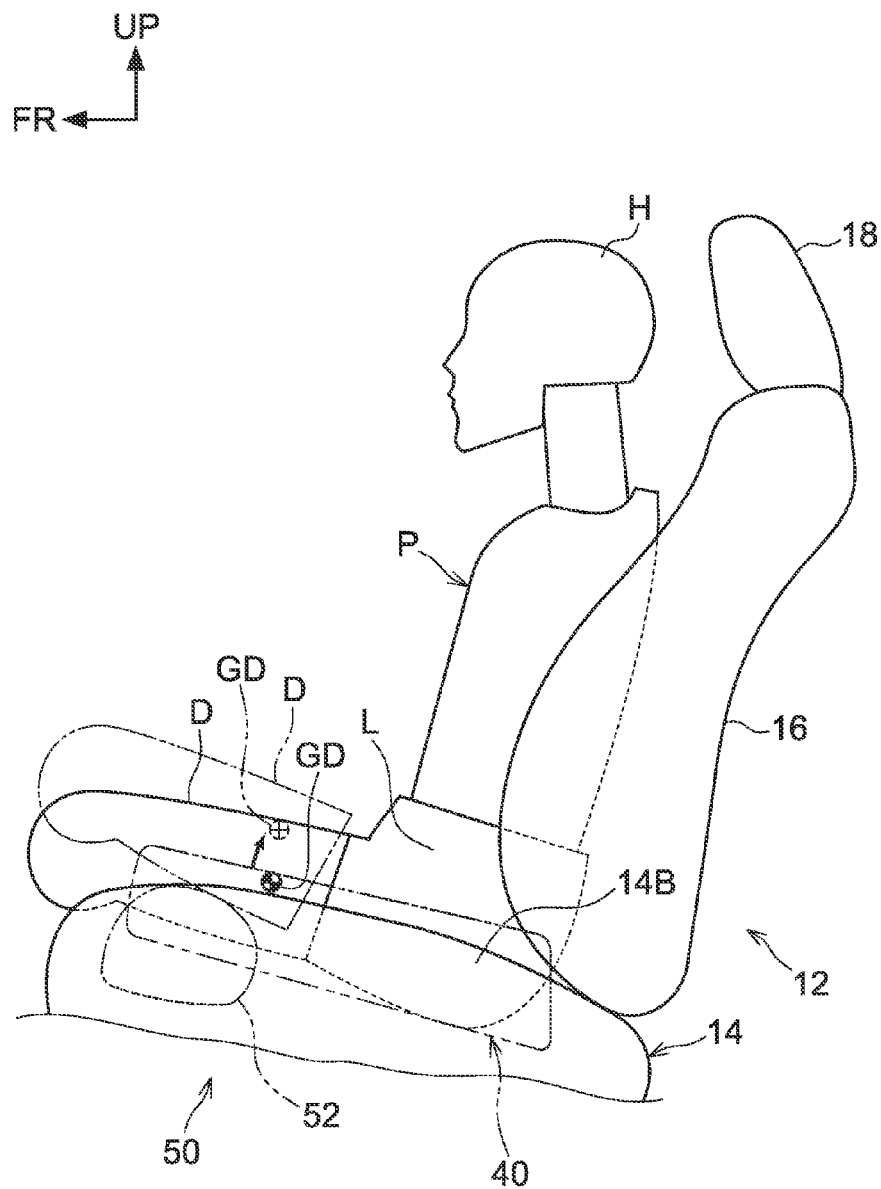
FIG. 7 is a side view of a vehicle seat in which the occupant protection device for a vehicle in accordance with the second exemplary embodiment is employed, showing inflated states of a side airbag and a seat cushion airbag, in which the thigh area of an occupant that has been lifted up by the seat cushion airbag is depicted by two-dot chain lines.

As shown in FIG. 6, the seat cushion airbag 52 structuring the occupant protection device 50 is stowed at the seat lower side of the sitting portion 14A of the seat cushion 14 according to the present exemplary embodiment. The seat cushion airbag 52 is structured in a bag shape by outer periphery portions of plural base cloths being sewn together, in a similar manner to the side airbag 40. The seat cushion airbag 52 is formed in a substantially rectangular shape in plan view and is stowed at the seat lower side of the thigh area D.

The seat cushion airbag 52 is in fluid communication with the side airbag 40. Gas is supplied from the inflator 24 to the seat cushion airbag 52 via the side airbag 40. In specific terms, a communication hole 54 is formed at a front end portion of the side airbag 40, and the interior cavity of the side airbag 40 is in fluid communication with the interior cavity of the seat cushion airbag 52 through this communication hole 54. The inflator 24 is disposed inside the side airbag 40. Therefore, the gas that is jetted out from the gas jetting-out portion 24A of the inflator 24 flows through the side airbag 40 to the seat front side and flows through the communication hole 54 into the seat cushion airbag 52.

The inflator 24 extends along the side airbag 40 in the seat front-and-rear direction. The gas jetting-out portion 24A is provided at the rear end portion of the inflator 24. Therefore, when the gas is jetted out from the gas jetting-out portion 24A of the inflator 24, inflation starts from the rear side of the side airbag 40. After the gas has flowed to the front side of the side airbag 40, the gas flows through the communication hole 54 from the side airbag 40 into the seat cushion airbag 52 (see arrow G in FIG. 6). Therefore, the seat cushion airbag 52 completes inflation after the side airbag 40 has completed inflation. As an example, the present exemplary embodiment is structured such that the inflation of the seat cushion airbag 52 is completed 10 to 20 ms after the inflation of the side airbag 40 is completed. A structure in which a portion of the gas flows into the seat cushion airbag 52 immediately after the activation of the inflator 24 is conceivable. In this structure too, the completion of inflation of the seat cushion airbag 52 is delayed till after the completion of inflation of the side airbag 40.

—Operation and Effects—

Now, operation and effects of the present exemplary embodiment are described.

In the occupant protection device 50 according to the present exemplary embodiment, when there is a collision such as a diagonal collision, a frontal collision or the like, the inflator 24 is activated and the seat cushion airbag 52 is inflated, as a result of which the sitting portion 14A of the seat cushion 14 bulges to the seat upper side. Consequently, the thigh area D of an occupant P is lifted up as illustrated by the imaginary lines (two-dot chain lines) in FIG. 7. As a result, an occurrence of "submarining", in which the posture of the occupant P slides downward toward the seat front side, may be inhibited.

As shown in FIG. 6, the present exemplary embodiment has a structure in which the seat cushion airbag 52 and the side airbag 40 are in fluid communication and the gas is supplied to the seat cushion airbag 52 via the side airbag 40. Consequently, the side airbag 40 completes inflation prior to the seat cushion airbag 52. Thus, a case of the thigh area D of the occupant P being outside the protection range of the side airbag 40 at a timing at which the thigh area D is being protected from a collision body or the like may be inhibited.

The above effect is described by comparison with a structure according to a comparative example in which the side airbag 40 and the seat cushion airbag 52 complete inflation at the same time. In the structure according to the comparative example in which the side airbag 40 and the seat cushion airbag 52 complete inflation at the same time, the seat cushion airbag 52 inflates earlier than in the present exemplary embodiment. Therefore, the thigh area D of the occupant P is lifted up earlier (see the imaginary lines in FIG. 7). In this state, as illustrated in FIG. 7, a center of gravity GD of the thigh area D is moved to the seat upper side relative to the side airbag 40 in the inflated state thereof. Thus, in regard to protecting the thigh area D of the occupant P from a collision body or the like, there is scope for improvement.

In contrast, in the present exemplary embodiment as described above, the side airbag 40 completes inflation prior to the seat cushion airbag 52. Therefore, a case of the thigh area D of the occupant P being outside the protection range of the side airbag 40 at a timing at which the thigh area D is being protected from a collision body or the like may be inhibited. Moreover, because the completion of inflation of the seat cushion airbag 52 is delayed till after the side airbag 40, a case of the thigh area D being lifted up and the occupant P being moved to the seat front side may be inhibited.

During a collision such as a frontal collision of the vehicle, the side airbag 40 and the seat cushion airbag 52 may be inflated and protect the occupant P at suitable timings. For example, when the vehicle is in a frontal collision, the frontal collision is detected by the unillustrated collision sensor, a predetermined duration after which the occupant P starts to move to the seat front side due to inertia. Because the seat cushion airbag 52 is inflated later than the side airbag 40, the sitting portion 14A may be caused to bulge to the seat upper side and lift up the thigh area D of the occupant P at a timing at which the occupant P starts to move by inertia to the seat front side.

In particular, because the gas jetting-out portion 24A is provided at the rear end portion of the inflator 24 in the present exemplary embodiment, the gas is supplied through the rear portion of the side airbag 40, the gas flows to the front end portion of the side airbag 40, and then the gas is supplied from the front end portion of the side airbag 40 to the seat cushion airbag 52. Thus, the inflation timing of the seat cushion airbag 52 may be delayed with a simple structure.

The present exemplary embodiment has a structure in which both the seat cushion airbag 52 and the side airbag 40 are inflated using the single inflator 24. Therefore, space for disposing inflators may be reduced compared to a structure in which an inflator that supplies gas to a seat cushion airbag is disposed separately. Thus, space may be saved.

Hereabove, the present disclosure has been described in accordance with the first and second exemplary embodiments. These exemplary embodiments may be used in combination as appropriate, and it will be clear that numerous modes may be embodied within a technical scope not departing from the gist of the present disclosure. For example, in the exemplary embodiments described above, the side airbag 40 is stowed only in the side support portion 14B at one side of the seat width direction, but this is not limiting. A structure is possible in which side airbags are disposed in side support portions at both sides of the seat width direction.

As shown in FIG. 4, the above exemplary embodiments have structures in which the side airbag 40 inflates inside the cover skin 32, but this is not limiting. A structure is possible in which a portion of the side airbag inflates and expands to outside the vehicle seat. For this structure, a technique is available in which a stitched portion is specified at a portion of the cover skin beforehand and the side airbag inflates and expands to outside the vehicle seat by rupturing the stitched portion with the inflation pressure of the side airbag.

The seat frame 26 according to the above exemplary embodiments is provided with the upright wall portion 26A, the upper wall portion 26B and the lower wall portion 26C, but this is not limiting. A structure is possible in which there is no lower wall portion 26C. In this structure, an attachment portion for attaching the inflator is formed at an upper portion of the seat frame. To be specific, a corner portion between the upright wall portion and the upper wall portion may be caused to protrude to the seat width direction inner side and the seat lower side to form the attachment portion.

In the above exemplary embodiments, the attachment portions 28 are formed integrally with the seat frame 26, but this is not limiting. For example, a structure may be employed in which an attachment portion is provided as a separate body and is joined to the seat frame.

As shown in FIG. 6, in the second exemplary embodiment the gas jetting-out portion 24A is provided at the rear end portion of the inflator 24, but this is not limiting. For example, a structure may be employed in which a gas jetting-out portion is provided at a front end portion of an inflator. In this structure, the side airbag may complete inflation first if the flow of gas is regulated by a diffuser (baffle plate) connected to the gas jetting-out portion or the like. That is, the completion of inflation of the seat cushion airbag may be delayed and the seat cushion airbag inflated at a suitable timing.

In the first aspect of the present disclosure, the seat frame is provided at the seat lower side of the side support portion of the seat cushion. The seat frame is provided with the upright wall portion that, seen from the seat front, extends in the seat vertical direction and the upper wall portion that projects to the seat width direction inner side from the upper end portion of the upright wall portion. The inflator is provided at the seat lower side of the upper wall portion of the seat frame. The side airbag that receives a gas supply from the inflator and is inflated is disposed between the side support portion and the seat frame. This side airbag is provided with the first inflation portion that, in the inflated state, causes the upper portion of the side support portion to bulge to the seat upper side and the seat width direction inner side (pushes up the upper portion of the side support portion). Thus, by the first inflation portion being inflated during a collision such as a side collision or the like, the upper portion of the side support portion may bulge to the seat upper side and the seat width direction inner side, restraining the pelvis area of an occupant (particularly the upper side of the pelvis area).

The side airbag is further provided with the second inflation portion that, in the inflated state, causes the lower portion of the side support portion to bulge to the seat upper side and the seat width direction inner side (pushes up the lower portion of the side support portion). Thus, by the second inflation portion being inflated, the lower portion of the side support portion may bulge to the seat upper side and the seat width direction inner side, restraining the thigh area and pelvis area (particularly the lower side of the pelvis area) of the occupant. In this manner, by the first inflation portion and second inflation portion of the side airbag being inflated, the upper portion and lower portion of the side support portion may be caused to bulge to the seat upper side and the seat width direction inner side, restraining the pelvis area and thigh area of the occupant over a wide range.

In an occupant protection device for a vehicle according to a second aspect, in the first aspect, an angled face that is angled to the seat lower side toward the seat width direction inner side is formed at the upper wall portion of the seat frame, and the second inflation portion inflates between the angled face and an occupant.

In the second aspect, the second inflation portion of the side airbag is subjected to a reaction force from the angled face and inflates to the seat upper side and the seat width direction inner side. Therefore, the lower portion of the side support portion may be caused to bulge to the seat upper side and the seat width direction inner side more effectively than in a structure in which the angled face is not formed at the upper wall portion.

In an occupant protection device for a vehicle according to a third aspect, in the first aspect or the second aspect, an attachment portion is provided at the seat frame, the attachment portion including an insertion hole through which a stud bolt protruding from the inflator is inserted, and, in the state in which the stud bolt has been inserted through the insertion hole, a distal end of the stud bolt is disposed at the seat width direction inner side relative to the upright wall portion and at the seat upper side relative to a lower end of the upright wall portion.

In the third aspect, the distal end of the stud bolt is disposed at the seat width direction inner side relative to the upright wall portion and at the seat upper side relative to the lower end of the upright wall portion. Therefore, if the outer side of the seat frame is covered by a cover skin, a case of the stud bolt piercing through the cover skin and protruding to the outside may be inhibited.

In an occupant protection device for a vehicle according to a fourth aspect, in any one of the first to third aspects, a seat cushion airbag is stowed at the seat lower side of the sitting portion, the seat cushion airbag, by receiving a gas supply and inflating, causing the sitting portion to bulge to the seat upper side and lifting up the thigh area of an occupant, the seat cushion airbag is in fluid communication with the side airbag, and the gas is supplied from the inflator to the seat cushion airbag via the side airbag.

In the fourth aspect, by the seat cushion airbag being inflated, the sitting portion is caused to bulge to the seat upper side, lifting up the thigh area of the occupant. Therefore, an occurrence of "submarining", in which the posture of the occupant slides downward toward the seat front side, may be inhibited. Because the seat cushion airbag and the side airbag are in fluid communication, the seat cushion airbag and the side airbag may both be inflated using a single inflator. Because the gas is supplied through the side airbag to the seat cushion airbag, the side airbag completes inflation prior to the seat cushion airbag. Thus, a case of the thigh area of an occupant being outside the protection range of the side airbag at a timing at which the thigh area is being protected from a collision body or the like may be inhibited.

In an occupant protection device for a vehicle according to a fifth aspect, in the fourth aspect, the side airbag and the seat cushion airbag are in fluid communication at a front end portion of the side airbag, the inflator extends along the side airbag in the seat front-and-rear direction, and a gas jetting-out portion is provided at a rear end portion of the inflator.

In the fifth aspect, the gas jetting-out portion is provided at the rear end portion of the inflator. Therefore, the gas may be supplied through a rear portion of the side airbag, flow to a front end portion of the side airbag, and then be supplied from the front end portion of the side airbag to the seat cushion airbag.

As described above, according to the occupant protection device for a vehicle relating to the first aspect, an excellent effect is provided in that restraint performance of the pelvis area and thigh area of an occupant during a collision of the vehicle may be improved.

According to the occupant protection device for a vehicle relating to the second aspect, an excellent effect is provided in that restraint performance of the pelvis area and thigh area of the occupant may be enhanced compared to a structure in which the angled face is not formed at the upper wall portion.

According to the occupant protection device for a vehicle relating to the third aspect, an excellent effect is provided in that, if the outer side of the seat frame is covered by a cover skin, design appearance of the vehicle seat may be excellently maintained.

According to the occupant protection device for a vehicle relating to the fourth aspect, an excellent effect is provided in that both an occurrence of submarining may be inhibited and protection performance of the thigh area of the occupant may be improved.

According to the occupant protection device for a vehicle relating to the fifth aspect, an excellent effect is provided in that an inflation timing of the seat cushion airbag may be delayed with a simple structure.

What is claimed is:

1. An occupant protection device for a vehicle, comprising:
   a seat frame provided at a seat lower side of a side support portion, the side support portion projecting from a seat cushion to the seat upper side at a seat width direction outer side relative to a sitting portion, and the seat frame including
      an upright wall portion that, viewed from the seat front, extends in the seat vertical direction and
      an upper wall portion that projects to the seat width direction inner side from an upper end portion of the upright wall portion;
   an inflator provided at the seat lower side of the upper wall portion; and
   a side airbag disposed between the side support portion and the seat frame, the side airbag receiving a gas supply from the inflator and inflating, and the side airbag including
      a first inflation portion that, in an inflated state, causes an upper portion of the side support portion to bulge to the seat upper side and the seat width direction inner side, and
      a second inflation portion that, in the inflated state, causes a lower portion of the side support portion to bulge to the seat upper side and the seat width direction inner side.

2. The occupant protection device for a vehicle according to claim 1, wherein
   an angled face that is angled to the seat lower side toward the seat width direction inner side is formed at the upper wall portion of the seat frame, and
   the second inflation portion inflates between the angled face and an occupant.

3. The occupant protection device for a vehicle according to claim 1, wherein
   an attachment portion is provided at the seat frame, the attachment portion including an insertion hole through which a stud bolt protruding from the inflator is inserted, and,
   in the state in which the stud bolt has been inserted through the insertion hole, a distal end of the stud bolt is disposed at the seat width direction inner side relative to the upright wall portion and at the seat upper side relative to a lower end of the upright wall portion.

4. The occupant protection device for a vehicle according to claim 2, wherein
   an attachment portion is provided at the seat frame, the attachment portion including an insertion hole through which a stud bolt protruding from the inflator is inserted, and,
   in the state in which the stud bolt has been inserted through the insertion hole, a distal end of the stud bolt is disposed at the seat width direction inner side relative to the upright wall portion and at the seat upper side relative to a lower end of the upright wall portion.

5. The occupant protection device for a vehicle according to claim 2, wherein
   a distal end portion of the angled face is bent back toward the seat lower side and toward the seat width direction outer side, and an end portion at the seat width direction inner side of the angled face forms a curved surface with a circular arc shape.

6. The occupant protection device for a vehicle according to claim 1, wherein
a seat cushion airbag is stowed at the seat lower side of the sitting portion, the seat cushion airbag, by receiving a gas supply and inflating, causing the sitting portion to bulge to the seat upper side and lifting up the thigh area of an occupant,
the seat cushion airbag is in fluid communication with the side airbag, and the gas is supplied from the inflator to the seat cushion airbag via the side airbag.

7. The occupant protection device for a vehicle according to claim 2, wherein
a seat cushion airbag is stowed at the seat lower side of the sitting portion, the seat cushion airbag, by receiving a gas supply and inflating, causing the sitting portion to bulge to the seat upper side and lifting up the thigh area of the occupant,
the seat cushion airbag is in fluid communication with the side airbag, and the gas is supplied from the inflator to the seat cushion airbag via the side airbag.

8. The occupant protection device for a vehicle according to claim 6, wherein
the side airbag and the seat cushion airbag are in fluid communication at a front end portion of the side airbag, the inflator extends along the side airbag in the seat front-and-rear direction, and a gas jetting-out portion is provided at a rear end portion of the inflator.

9. The occupant protection device for a vehicle according to claim 7, wherein
the side airbag and the seat cushion airbag are in fluid communication at a front end portion of the side airbag, the inflator extends along the side airbag in the seat front-and-rear direction, and a gas jetting-out portion is provided at a rear end portion of the inflator.

10. The occupant protection device for a vehicle according to claim 7, wherein
the side airbag and the seat cushion airbag are in fluid communication at a front end portion of the side airbag, the inflator extends along the side airbag in the seat front-and-rear direction, a gas jetting-out portion is provided at a front end portion of the inflator, and a diffuser is connected to the gas jetting-out portion.

11. The occupant protection device for a vehicle according to claim 8, wherein
the side airbag and the seat cushion airbag are in fluid communication at a front end portion of the side airbag, the inflator extends along the side airbag in the seat front-and-rear direction, a gas jetting-out portion is provided at a front end portion of the inflator, and a diffuser is connected to the gas jetting-out portion.

* * * * *